United States Patent [19]

Iehl

[11] 3,869,148

[45] Mar. 4, 1975

[54] HAULING HITCH

[75] Inventor: William R. Iehl, Waterloo, Iowa

[73] Assignee: Construction Machinery Company, Waterloo, Iowa

[22] Filed: Aug. 10, 1973

[21] Appl. No.: 387,525

[52] U.S. Cl................................. 280/457, 280/432
[51] Int. Cl............................................. B60d 1/12
[58] Field of Search .......... 280/457, 432; 24/68 TT, 24/69 TT; 248/361 R

[56] References Cited
UNITED STATES PATENTS
2,954,988  10/1960  Hallock............................. 280/457
3,346,273  10/1967  Folkerts............................. 280/457

Primary Examiner—M. Henson Wood, Jr.
Assistant Examiner—Michael Mar
Attorney, Agent, or Firm—Zarley, McKee, Thomte & Voorhees

[57] ABSTRACT

A hauling hitch comprising a tongue member having a horizontally disposed clevis at the forward end thereof for connection to the hitch of the towing vehicle. A safety chain is secured at one of its ends to the top forward end of the tongue member on the center line thereof and extends forwardly therefrom to extend around a suitable anchor on the towing vehicle. A chain latch mechanism is secured on center line of the tongue member and comprises a stationary jaw member having a movable jaw member pivotally secured thereto. The free end of the safety chain is selectively received between the jaw members of the latch mechanism. A loop type lock pin or keeper is secured to the free end of the safety chain and is selectively secured to the free end of the safety chain and is selectively secured to the jaw members to prevent the opening thereof to maintain the chain therein.

5 Claims, 5 Drawing Figures

PATENTED MAR 4 1975
3,869,148
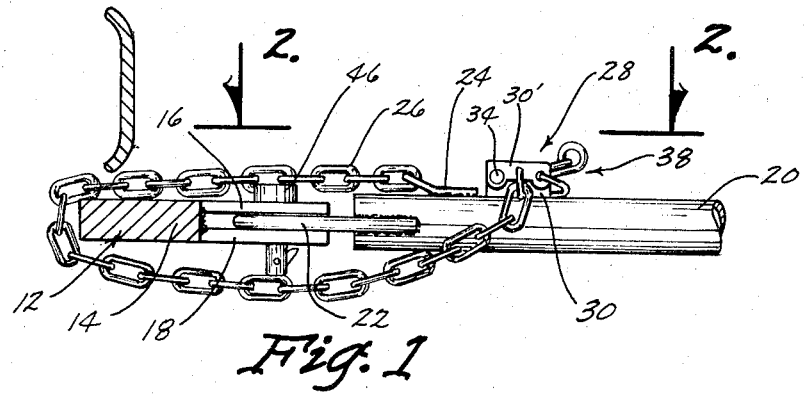
Fig. 1
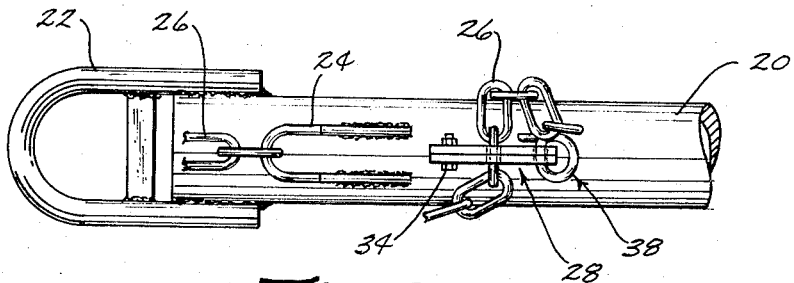
Fig. 2
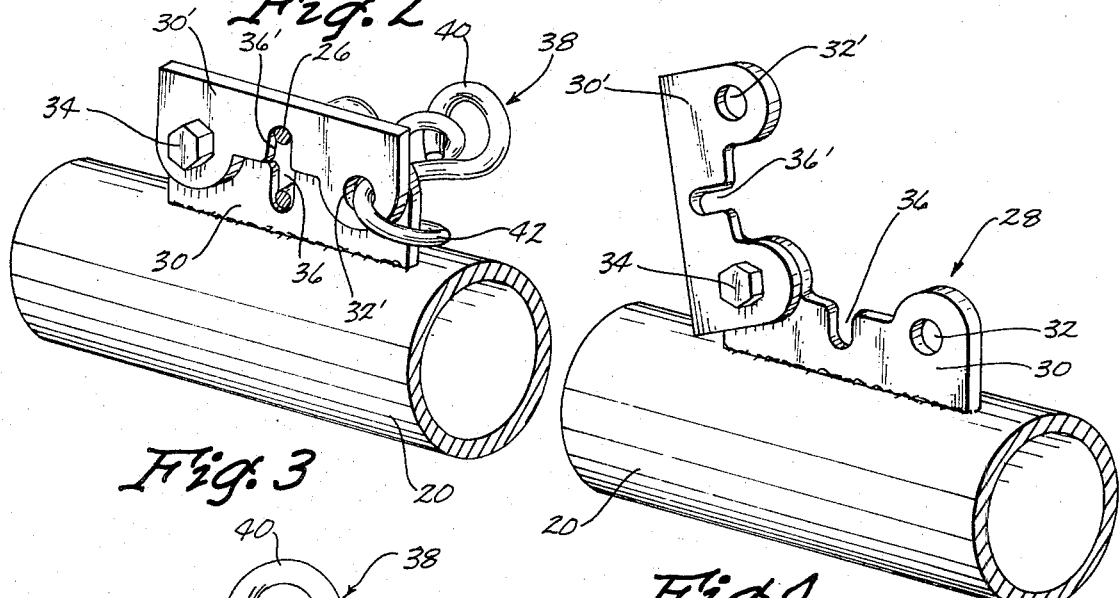
Fig. 3
Fig. 4
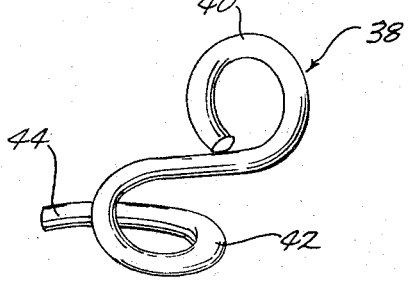
Fig. 5

HAULING HITCH

BACKGROUND OF THE INVENTION

This invention relates to a hauling hitch for hauling or towing equipment behind a towing vehicle. Conventional hauling hitches ordinarily have a pair of safety chains which are secured at their rearward ends to the hitch and which extend forwardly for connection to the hitch on the towing vehicle. The safety chains are not length adjustable nor are they easily and quickly attachable to the towing vehicle.

Therefore, it is a principal object of the invention to provide an improved hauling hitch.

A further object of the invention is to provide a hauling hitch having a single safety chain secured to the center line thereof.

A further object of the invention is to provide a hauling hitch having a scissor-like latch mechanism secured on center line to the forward end of the tongue element.

A further object of the invention is to provide a hauling hitch having a length adjustable safety chain secured thereto.

A further object of the invention is to provide a hauling hitch comprising a safety chain which may be easily and quickly secured to the towing vehicle.

A further object of the invention is to provide a hauling hitch which is economical of manufacture, durable in use and refined in appearance.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a partial side view of the hauling hitch:

FIG. 2 is a partial top view of the hauling hitch of FIG. 1:

FIG. 3 is a partial perspective view of the hauling hitch illustrating the latch mechanism in its closed or locked position:

FIG. 4 is a view similar to FIG. 3 except that the latch mechanism has been opened; and FIG. 5 is a perspective view of the loop type pin which is secured to one end of the safety chain.

DESCRIPTION OF THE PREFERRED EMBODIMENT

The numeral 10 refers generally to the hauling hitch of this invention while the numeral 12 refers to a hitch which is secured to the towing vehicle. For purposes of description, hitch 12 will be described as comprising a support 14 having a pair of rearwardly extending clevis elements 16 and 18.

Hitch 10 comprises generally an elongated tongue element 20 having a horizontally disposed U-shaped clevis element 22 secured to the forward end therof by welding or the like. Anchor 24 is secured to the top surface of the tongue element 20 adjacent the forward end thereof by welding or the like and has one end of the safety chain 26 secured thereto.

The numeral 28 refers generally to a scissor-like latch mechanism which is secured to the upper surface of the tongue element 20 rearwardly of the anchor 24 as illustrated in the drawings. Mechanism 28 comprises a jaw member 30 which is welded to the tongue element 20 as seen in FIG. 4. Jaw member 30 is provided with an opening 32 at its rearward end and an opening at its forward end which receives a bolt 34 extending therethrough. Jaw member 30 is provided with a U-shaped notch 36 extending downwardly therein as seen in FIG. 4. The numeral 30' refers to a jaw member which is identical to the jaw member 30 and which is pivotally secured thereto by the bolt 34. Jaw member 30 is provided with an opening 32' at its rearward end which is adapted to register with the opening 32 when the jaw member 30 is moved to its closed position as seen in FIG. 3. Jaw member 30' is provided with a U-shaped notch 36 formed therein which is adapted to register with the notch 36 as also seen in FIG. 3.

The numeral 38 refers to a loop-type lock pin or keeper having an arcuate portion 40 which is secured to the free end of the chain 28 as illustrated in FIG. 2. Pin 38 is also provided with an arcuate loop 42 and a free end 44.

Assuming that the latch mechanism 28 is in the open position of FIG. 4, the method of securing the hitch 10 to the hitch 12 is as follows. Clevis 22 is positioned between the clevis elements 16 and 18 with the hitch pin 46 then being extended downwardly therethrough in conventional fashion. The safety chain 26 is extended around any suitable anchor on the towing vehicle such as the support 14 as seen in FIG. 1 and then extended rearwardly back to the latch mechanism 28. The desired link of the chain 26 is positioned in the notch 36 with the jaw member 30' then being closed as illustrated in FIG. 3. The free end 44 of the pin 38 is then threaded through the openings 32 and 32' until loop 42 is positioned in the openings. Thus, the desired link is locked between the jaw members 30 and 30' and is trapped therein by the lock pin 38.

The safety chain 26 is adjustably secured to the latch mechanism 28 so that the safety chain may be secured to any convenient anchor on the towing vehicle and so that the chain will not drag on the road as the equipment is being towed. The latch mechanism 28 may be easily and quickly locked and unlocked with respect to the desired link of the chain which greatly facilitates the connection of the hauling hitch to the towing vehicle. The fact that the safety chain is secured to the tongue element on the center line thereof greatly increases the stability of the safety chain should the hitch pin 46 become disengaged during the transport of the equipment.

Thus it can be seen that a greatly improved hauling hitch has been provided which accomplishes at least all of its stated objectives.

I claim:

1. A hauling hitch comprising, an elongated tongue element having forward and rearward ends, means on the forward end of said tongue element for connection to a towing vehicle, a chain locking means on said tongue element rearwardly of the forward end thereof, a safety chain secured at one of its ends to said tongue element, said safety chain extending forwardly from said tongue element to extend around an anchor on the towing vehicle thence rearwardly towards said locking means, said locking means comprising means for selectively securing said safety chain thereto, said locking means comprising a first jaw member secured to said tongue element, a second jaw member pivotally secured to said first jaw member and movable between open and closed positions with respect to said first jaw member, said chain being selectively received between said jaw members, and a keeper selectively maintaining said second jaw member in its said closed position.

2. The hitch of claim 1 wherein said first jaw member is vertically disposed and has first and second ends, said first jaw member having a U-shaped notch formed therein between its ends, said second jaw member having first and second ends and a U-shaped notch formed therein between its ends, said first ends of said jaw members being pivotally secured together, said second ends of said jaw members having openings formed therein which are adapted to register when said second jaw member is moved to its closed position, said chain being received by said U-shaped notches, said keeper removably extending through said registering openings.

3. The hitch of claim 2 wherein said keeper comprises a loop-type keeper.

4. The hitch of claim 3 wherein said keeper is secured to said other end of said chain.

5. The hitch of claim 2 wherein said first jaw member is secured to the upper surface of said tongue element on the center line thereof.

* * * * *